United States Patent
Berrajaa et al.

(10) Patent No.: US 9,378,645 B2
(45) Date of Patent: Jun. 28, 2016

(54) METHOD AND DEVICE FOR CONSTRUCTING A VERTICAL PROFILE FOR A DESCENT AND/OR AN APPROACH OF AN AIRCRAFT

(71) Applicant: Airbus Operations S.A.S., Toulouse (FR)

(72) Inventors: Jaouad Berrajaa, Plaisance du Touch (FR); Virginie Le Gall, Tournefeuille (FR); Alexandre Buisson, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 14/549,745

(22) Filed: Nov. 21, 2014

(65) Prior Publication Data

US 2015/0149002 A1    May 28, 2015

(30) Foreign Application Priority Data

Nov. 27, 2013   (FR) ...................................... 13 61668

(51) Int. Cl.
| | |
|---|---|
| *G05G 5/02* | (2006.01) |
| *G08G 5/02* | (2006.01) |
| *G05D 1/00* | (2006.01) |
| *G05D 1/06* | (2006.01) |
| *G08G 5/00* | (2006.01) |
| *G01C 23/00* | (2006.01) |

(52) U.S. Cl.
CPC  *G08G 5/02* (2013.01); *G01C 23/00* (2013.01); *G05D 1/00* (2013.01); *G05D 1/0005* (2013.01); *G05D 1/0676* (2013.01); *G08G 5/0034* (2013.01); *G08G 5/025* (2013.01)

(58) Field of Classification Search
CPC ........................................................ G08G 5/02
USPC ............................................................. 701/18
See application file for complete search history.

(56) References Cited

U.S. PATENT DOCUMENTS

| | | | | |
|---|---|---|---|---|
| 7,602,314 | B2* | 10/2009 | Winkler | G01C 23/005 340/971 |
| 8,989,923 | B2* | 3/2015 | De Prins | G01C 23/005 244/194 |

(Continued)

FOREIGN PATENT DOCUMENTS

| | | |
|---|---|---|
| FR | 2916842 A1 | 12/2008 |
| FR | 2944634 A1 | 10/2010 |

(Continued)

OTHER PUBLICATIONS

French Patent and Trademark Office, French Search Report for Application No. 1361668 mailed Sep. 12, 2014.

(Continued)

*Primary Examiner* — Thomas Tarcza
*Assistant Examiner* — Alex C Dunn
(74) *Attorney, Agent, or Firm* — Ingrassia Fisher & Lorenz, P.C.

(57) ABSTRACT

This relates to a method and device for constructing a vertical profile for an aircraft descent and/or approach. The construction device comprises a data-capture unit configured to provide, for at least one of a plurality of parameters, a value relating to a user strategy. A construction unit is configured to automatically construct a vertical profile for an aircraft descent and/or approach, using the value thus provided.

6 Claims, 2 Drawing Sheets

(56) References Cited

U.S. PATENT DOCUMENTS

| | | | | |
|---|---|---|---|---|
| 2010/0265268 | A1* | 10/2010 | Wilson | G08G 5/025 345/619 |
| 2010/0305781 | A1* | 12/2010 | Felix | G05D 1/101 701/3 |
| 2011/0208374 | A1* | 8/2011 | Jayathirtha | G05D 1/0676 701/5 |
| 2012/0253562 | A1* | 10/2012 | Wachenheim | G08G 5/0034 701/4 |
| 2012/0290154 | A1* | 11/2012 | Lopez Leones | G08G 5/0021 701/3 |
| 2012/0290155 | A1* | 11/2012 | Dulac | G05D 1/0676 701/18 |
| 2014/0365041 | A1* | 12/2014 | Deker | G05D 1/0607 701/4 |

FOREIGN PATENT DOCUMENTS

| | | |
|---|---|---|
| FR | 2953302 A1 | 6/2011 |
| FR | 2980610 A1 | 3/2013 |

OTHER PUBLICATIONS

Sopjes et al., "Continuous Descent Approaches with Variable Flight-Path Angles Under Time Constraints," AIA Guidance, Navigation, and Control Conference, Aug. 8, 2011, pp. 1-20, American Institute of Aeronautics and Astronautics.

* cited by examiner

METHOD AND DEVICE FOR CONSTRUCTING A VERTICAL PROFILE FOR A DESCENT AND/OR AN APPROACH OF AN AIRCRAFT

CROSS REFERENCE TO RELATED APPLICATION

This application claims priority to French Patent Application No. 13 61668 filed Nov. 27, 2013, which is incorporated herein by reference in its entirety.

TECHNICAL FIELD

This application pertains to a method and a device for constructing a vertical profile for a descent and/or an approach of an aircraft, particularly a transport plane, notably with a view to making a landing on an airport runway.

BACKGROUND

It is known that a flight management system (FMS) can offer the crew of an aircraft assistance in the nominal execution of the descent and/or approach phases by constructing an optimized vertical profile.

In general, a vertical profile comprises an altitude profile and a speed profile. The construction of a vertical profile needs to meet various altitude and speed constraints devised and published by the authorities. Optimizing the vertical profile consists of applying a predefined strategy in the flight management system. Usually, the vertical profile is calculated using a known construction method and the values of a plurality of parameters.

During the descent and/or the approach, the crew flies the aircraft in such a way that it follows the vertical profile calculated by the flight management system. However, the crew has to execute the descent and approach operation while adhering to a great many constraints.

In particular, the crew has to adhere to various clearances issued by air traffic control, such as: clearance to start a descent; successive clearances to enter increasingly low altitudes or flight levels; maximum and/or minimum speed clearances; clearance to execute the approach; and clearance to land.

The clearances given by air traffic control may be more or less intrusive and may thus disrupt the ability to adhere to the vertical profile calculated by the flight management system.

Furthermore, the crew must also adapt to the actual conditions at the arrival airport in terms of actual air traffic, weather conditions, and operating constraints.

In the case of a commercial transport plane, the crew must generally execute the descent and approach operation while additionally conforming to a policy or strategy set by the airline.

Within a context in which optimizing the flight in terms of fuel consumption and flying time is becoming increasingly important, tying the aircraft to an optimized vertical profile would make it possible to conform to the airline's strategy while at the same time taking account of the environment in which the aircraft is flying, guaranteeing maximum savings (of fuel, time).

Currently, the single strategy for constructing the vertical profile that exists in a flight management system does not always make it possible to conform to the aforementioned wide range of requirements and constraints. Thus the vertical profile may be abandoned by the crew or considered merely as information that does not allow an optimal automated flight. It would therefore be desirable to provide an improved method and device for constructing a vertical profile for a descent and/or an approach of an aircraft, In addition, other objects, desirable features and characteristics will become apparent from the subsequent summary and detailed description, and the appended claims, taken in conjunction with the accompanying drawings and this background.

SUMMARY

Accordingly there is provided a method comprising a first set of steps consisting of constructing a vertical profile with the aid of a construction method using values of a plurality of reference parameters, the first set of steps comprising: providing, for at least one of a plurality of parameters referred to as strategic parameters, a value relating to a user strategy, the strategic parameters corresponding to at least some of the reference parameters; and automatically constructing the vertical profile using the value thus provided so as to obtain an optimal vertical profile.

The values of a given parameter should be understood as meaning all the possible options offered for setting (or adjusting) this parameter. This may be a numerical value, but may also be a particular (standard, etc.) type or setting for this parameter, as specified hereinbelow.

Thus, the construction method described herein makes it possible to adapt the initial construction of a vertical profile to suit a particular user strategy, notably an airline strategy, by taking into consideration one or several particular values of parameters referred to as strategic parameters, this making it possible to adapt the construction of the vertical profile notably to suit a particular user policy and/or user operational recommendations.

Thus, in order to construct the vertical profile (for descent and/or approach), the construction method does not use a single default strategy (defined for all possible users) but collects parameter values that are defined (and provided) by the actual user and uses them to construct an optimum vertical profile suited to the strategy of this actual user, preferably an airline, the strategy of which may, for example, comprise the maximum optimization of fuel consumption and/or strict adherence to timings.

Advantageously, the strategic parameters comprise at least one parameter relating to at least one of the following element; at least one type of vertical profile; at least one final approach speed strategy; at least one aircraft configuration sequence; at least one deceleration assumption; and at least one assumption regarding the use of the aircraft airbrakes.

Moreover, in one preferred embodiment, the method additionally comprises a second set of steps carried out during a flight of the aircraft and comprising: presenting the crew of the aircraft with the values of a plurality of parameters referred to as tactical parameters, which have been used to calculate the vertical profile, the tactical parameters corresponding to at least some of the reference parameters; modifying at least one of said tactical parameter values presented in step a); and automatically reconstructing the vertical profile using the value(s) modified in step b) so as to obtain an optimized vertical profile.

This preferred embodiment allows the crew to modify the values of parameters (referred to as tactical parameters) used for constructing the vertical profile, notably so as to adapt them to suit the actual situation (weather conditions, amount of air traffic on arrival, operating constraints, etc.) that the aircraft will encounter during the descent and/or the approach. This preferred embodiment takes these modifications into consideration and therefore constructs a new (optimized) vertical profile adapted to suit the tactical situation of the flight. For preference, the tactical parameters are modified by the crew, if need be, during the phase of cruising flight during the preparation for the arrival.

Advantageously, the tactical parameters comprise at least one parameter relating to at least one of the following elements: at least one type of vertical profile; at least one final approach speed strategy; at least one aircraft speed stabilization altitude; at least one aircraft configuration sequence; at least one deceleration assumption; and at least one assumption regarding the use of the aircraft airbrakes.

In one particular embodiment, the method comprises an additional step, forming part of said second set of steps, situated between steps b) and c), and consisting in verifying and validating each tactical parameter value modified in step b), only modified values that have been verified and validated being used in step c).

Embodiments described herein also relate to a device for constructing a vertical profile for a descent and/or an approach of an aircraft, particularly a transport plane.

Accordingly the construction device of the type comprising a construction unit configured to construct a vertical profile using a method of construction using values of a plurality of reference parameters, is notable in that it additionally comprises a data capture unit configured to provide, for at least one of a plurality of parameters referred to as strategic parameters, a value relating to a user strategy, the strategic parameters corresponding to at least some of the reference parameters and in that the construction unit is configured to automatically construct said vertical profile using the value thus provided.

In one preferred embodiment, the construction device additionally comprises: a display unit configured to present the crew, during a flight of the aircraft, with the values of a plurality of parameters referred to as tactical parameters, which are used to calculate the vertical profile, the tactical parameters corresponding to at least some of said reference parameters; an auxiliary data-capture unit configured to allow the crew to modify at least one of the tactical-parameter values presented by the display unit; and an auxiliary construction unit configured to automatically reconstruct the vertical profile using the value or values modified using the auxiliary data-capture unit, so as to obtain an optimized vertical profile.

Preferably, the auxiliary construction unit corresponds to said construction unit.

The present invention also relates to an aircraft, particularly a transport plane, which comprises a construction device like that specified hereinabove.

BRIEF DESCRIPTION OF THE DRAWINGS

The present invention will hereinafter be described in conjunction with the following drawing figures, wherein like numerals denote like elements, and.

The figures of the attached drawing will make it easy to understand how the invention may be embodied. In these figures, identical references denote elements that are similar.

DETAILED DESCRIPTION

Figure 1:
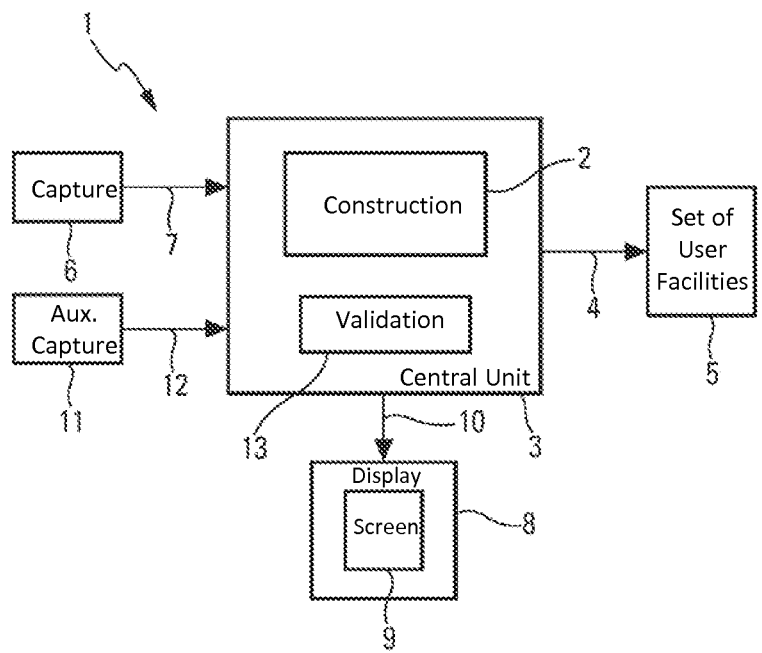
FIG. 1 is the block diagram of a device for constructing a vertical profile, and illustrates one embodiment of the invention.

The following detailed description is merely exemplary in nature an is not intended to limit the invention or the application and uses of the invention. Furthermore, there is no intention to be bound by any theory presented in the preceding background of the invention or the following detailed description.

The device 1 depicted schematically in Fig. is intended to automatically construct a vertical profile for a descent and/or an approach of an aircraft; e.g. a civil transport plane, notably with a view to landing on a runway of an airport.

To achieve this, the construction device 1 comprises a construction unit 2 configured to construct a vertical profile using a conventional construction method, using values of a plurality of reference parameters. In general, the vertical profile is constructed by performing a calculation in the upstream direction, namely backward. The backward calculation of the vertical profile is generally performed from a calculation starting point, namely the runway threshold or, depending on the type of approach for example, a usual point (such as a "missed approach point" or a "final end point"), up to an end-of-calculation point, for example the last level in cruising flight. The vertical profile is calculated taking into consideration speed and/or altitude limitations introduced into the flight plan.

This usual method of construction implemented by the construction unit 2 is well known and not described any further in the following description.

The construction unit 2 forms part of a central unit 3 notably corresponding to a flight management system (FMS) of the aircraft. The construction unit 2 via a link 4 transmits the vertical profile to a set 5 of user facilities, for example a display device for displaying the vertical profile on a screen on the flight deck and/or an aircraft guidance system, for example an automatic pilot system or a flight director, which uses the vertical profile to guide or assist with guiding the aircraft AC during the descent and/or the approach.

According to an embodiment, the construction device 1 additionally comprises a (data) capture unit 6 configured to provide, for at least one of a plurality of parameters referred to as strategic parameters, a value relating to a user strategy. The strategic parameters considered and specified hereinbelow correspond to at least some of the reference parameters usually employed by the construction unit 2.

In addition, according to the invention, the construction unit 2 automatically constructs the vertical profile using the value or values thus formed and received via a link 7.

Thus, in order to construct the vertical profile PV (for descent and/or approach), the construction device 1 does not use a single default strategy defined for all possible users but collects parameters defined by the actual user and uses them to construct an optimal vertical profile adapted to suit the strategy of that user.

For preference, that user is an airline, the strategy of which may, for example, consist in maximal optimization of fuel consumption or strict adherence to timings.

The strategic parameters comprise at least one of the following parameters (the possible "values" for which have been specified):
    a type of vertical profile:
    minimizing the use of engine thrust as far as possible;
    geometric (engine thrust adapted for flying a portion of the profile in a straight line, referred to as "geometric path");
    approach with a deceleration level segment;
    approach with continuous descent;
    a final approach speed strategy:
    stabilized;
    decelerated;

an aircraft configuration sequence:
  standard sequence: first settings for flaps/slats, then landing gear, then last settings for flaps/slats;
  adapted sequence: successive settings for flaps/slats and landing gear as required (need to decelerate early or later);
deceleration assumptions:
slow deceleration with large margins;
modest deceleration with modest margins;
sharp deceleration with little or no margins; and
assumptions regarding the use of airbrakes of the aircraft:
no airbrakes;
with 50% of airbrakes when necessary;
with 100% of airbrakes when necessary.

The deceleration assumption may also be defined in terms of the percentage of the maximum margins considered.

Parameters (the strategic parameters) can thus be customized by the airline when defining the basic configuration of the aircraft and can be standardized across a given fleet of aircraft.

The strategy for constructing the vertical descent and approach profile is defined by the airline and provided upon delivery of the flight management system in the configuration file thereof.

An aircraft performance database, if necessary, implements new tables that allow the flight management system to adapt the values used for constructing an optimized vertical profile that corresponds to the choices made by the airline.

The new parameters introduced into the configuration file of the flight management system may comprise at least one of the following parameters:
  A. a type of vertical profile:
  approach: value 1: with deceleration level segment;
  value 2: continuous descent;
  descent: value 3: minimize engine thrust;
  value 4: geometric profile;
    This parameter is used by the construction unit 2 to choose which construction calculation algorithm to use;
  B. a final approach speed strategy:
  value 1: final stabilized;
  value 2: final decelerated;
    This parameter is used by the construction unit 2 for defining the final approach speed evolution strategy;
  C. an aircraft configuration sequence:
  value 1: standard sequence;
  value 2: adapted sequence;
    This parameter is used by the construction unit 2 for searching the performance database for the aircraft configuration strategy to be used in constructing the speed profile;
  D. deceleration assumptions:
  numerical value defining a percentage of the margin to be considered in relation to the deceleration capability of the aircraft;
  discrete values defining a number of margin states with respect to the deceleration capability of the aircraft;
    This parameter is used by the construction unit 2 to adapt the margins applied to the ability of the aircraft to decelerate when constructing the speed profile;
  E. assumptions on the use of airbrakes of the aircraft:
  value 1: without airbrakes;
  value 2: with 50% of the airbrakes when necessary;
  value 3: with 100% of the airbrakes when necessary.
    This parameter is used by the construction unit 2 to choose the airbrake usage strategy when processing segments in which a sharp deceleration is required.

Furthermore, in a preferred embodiment, the construction device 1 additionally comprises: a display unit 8 configured to present the crew of the aircraft, on a display screen 9, during a flight of the aircraft, with the values of a plurality of parameters referred to as tactical parameters, which had been used by the construction unit 2 to calculate (construct) the vertical profile and which are received via a link 10 from the central unit 3. The tactical parameters correspond to at least some of the reference parameters; an auxiliary (data) capture unit 11, which comprises the usual elements such as a touchpad, a keyboard or a control ball, which is connected via a link 12 to the central unit 3 and allows the crew to modify at least one of the tactical-parameter values presented by the display unit 8; and an auxiliary construction unit that forms part of the central unit 3 and preferably corresponds to the construction unit 2. This auxiliary construction unit is formed in such a way as to automatically reconstruct the vertical profile as a function of the values modified using the auxiliary capture unit 11, so as to obtain an optimized vertical profile.

In one particular embodiment, the auxiliary capture unit 11 and the display unit 8 form part of a man/machine interface associated with the central unit 3 and providing, for example, access to a page for preparing the descent and the approach.

Figure 2:
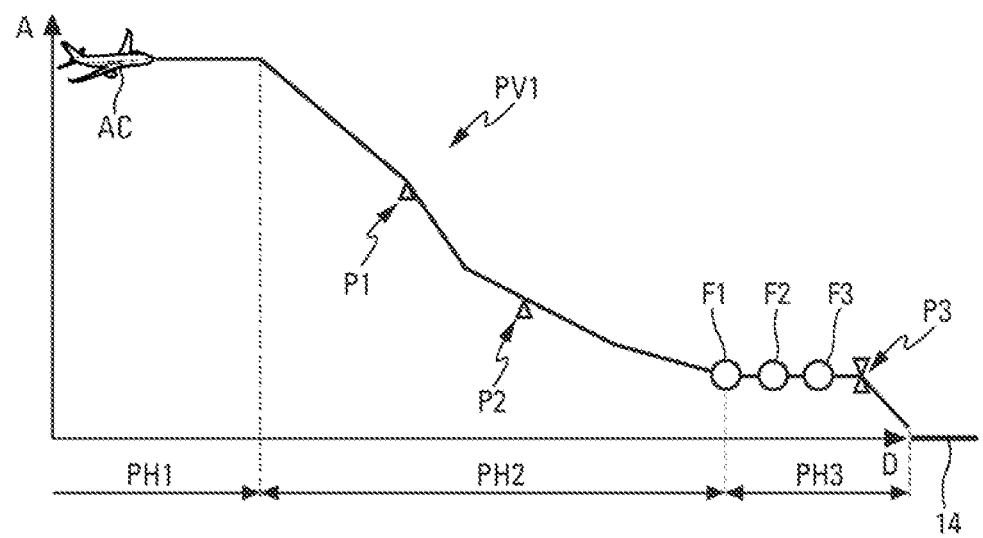
FIGS. 2 to 4 show various examples of vertical profiles that can be obtained in accordance with embodiments described herein.

The aforementioned preferred embodiment allows the crew to modify the values of parameters (referred to as tactical parameters) used in constructing the vertical profile, notably in order to adapt them to suit the actual situation (weather conditions, state of air traffic on arrival, operating constraints, etc.) which will be encountered by an aircraft AC in FIG. 2 during the descent and the approach. This preferred embodiment takes these modifications into consideration and constructs a new (optimized) vertical profile adapted to suit the tactical situation of the flight. For preference, the tactical parameters are modified by the crew, if need be, during the phase of cruising flight when preparing for the arrival.

The tactical parameters comprise at least one of the following parameters (for which possible "values" have been specified):
  a type of vertical profile:
  minimizing the use of engine thrust as far as possible;
  geometric (engine thrust adapted for flying a portion of the profile in a straight line, referred to as "geometric path");
  approach with a deceleration level segment;
  approach with continuous descent;
  a final approach speed strategy:
  stabilized;
  decelerated;
  an aircraft speed stabilization altitude (dependent on the weather conditions of the day);
  an aircraft configuration sequence:
  standard sequence: first settings for flaps/slats, then landing gear, then last settings for flaps/slats;
  adapted sequence: successive settings for flaps/slats and landing gear as required (need to decelerate early or later);
  deceleration assumptions:
  slow deceleration with large margins;
  modest deceleration with modest margins;
  sharp deceleration with little or no margins;
  assumptions regarding the use of airbrakes of the aircraft:
  no airbrakes;
  with 50% of airbrakes when necessary;
  with 100% of airbrakes when necessary.

The "values" of any parameter (strategic parameter or tactical parameter) therefore relate to all the possible options offered for setting (or adjusting) this parameter. It may be a numerical value (50% of airbrakes for example) but may also be a specific type ("standard" or "adapted" in the case of the configuration sequence, etc.) of this parameter.

In one particular embodiment, the device 1 additionally comprises a verification and validation unit 13 which is, for example, incorporated into the central unit 3 and formed in such a way as to verify and validate each tactical-parameter value modified by the crew using the auxiliary capture unit 11. In this particular embodiment, the construction unit 2 uses for reconstructing the vertical profile only the modified values which have been verified and validated by the unit 13.

Therefore the crew adapts the parameters used for the construction of the vertical profile to suit the forecast tactical situation and, after the results of the modifications made by the crew have been verified and validated, the central unit 3 reruns the calculation of the descent and approach vertical profile using these new parameters in its calculation algorithm.

A vertical profile is therefore constructed by the construction unit 2 of the central unit 3 (preferably a flight management system), using the various parameters defined by the airline. Once the tactical situation is known during preparation for arrival, the crew adapts the parameters (tactical parameters) for the construction of the vertical profile to suit the actual situation. The construction device 1 takes these modifications into consideration and constructs a new optimized vertical profile adapted to suit the tactical situation. In order to maximize the usability of the vertical profile, provision is made for the construction rules to be adapted to suit the particular requirements of the various users and the particular operating conditions. Users (airlines and/or crew) are offered the opportunity to define the strategy for constructing the vertical profile that meets their specific needs.

On the basis of logic internal to the construction device 1, for constructing the descent/approach profile, the airline determines various parameters (type of profile, strategy for extension of the configurations during the approach, etc.). While at the same time being suited to the performance specific to the aircraft and the conditions of the day (air traffic, weather, etc.), the vertical profiles that result from these adjustments meet the flight strategies specific to each airline.

By way of illustration, a descent/approach altitude profile PV1 resulting from particular adjustment choices (namely type of profile: minimized engine thrust, with deceleration level segment; approach configuration sequence: standard) of a first airline C1 is depicted in FIG. 2.

In FIG. 2, and in FIGS. 3 and 4 specified hereinbelow: the vertical profile (PV1, PV2, PV3, respectively) has been depicted in the form of an altitude profile indicating the variation in altitude A (or height of a runway 14 (on which the crew intend to land)) as a function of a distance D notably with respect to the threshold of this runway 14; various phases of flight have been depicted, namely a phase of cruising flight PH1, a descent phase PH2 and an approach phase PH3; various waypoints P1, P2 and P3 have been depicted, these being points at which altitude (and/or speed) constraints are imposed; a point F1 has been depicted which indicates the start of the approach phase PH3; and various points F2 and F3 have been depicted these indicating modifications to the aerodynamic configuration of the aircraft.

The vertical profile PV1 illustrated in FIG. 2 is calculated in such a way as to minimize the engine thrust of the aircraft AC during the descent phase, while at the same time meeting the published constraints, and the approach is made level (namely with a deceleration toward the approach speed at constant altitude).

Figure 3:
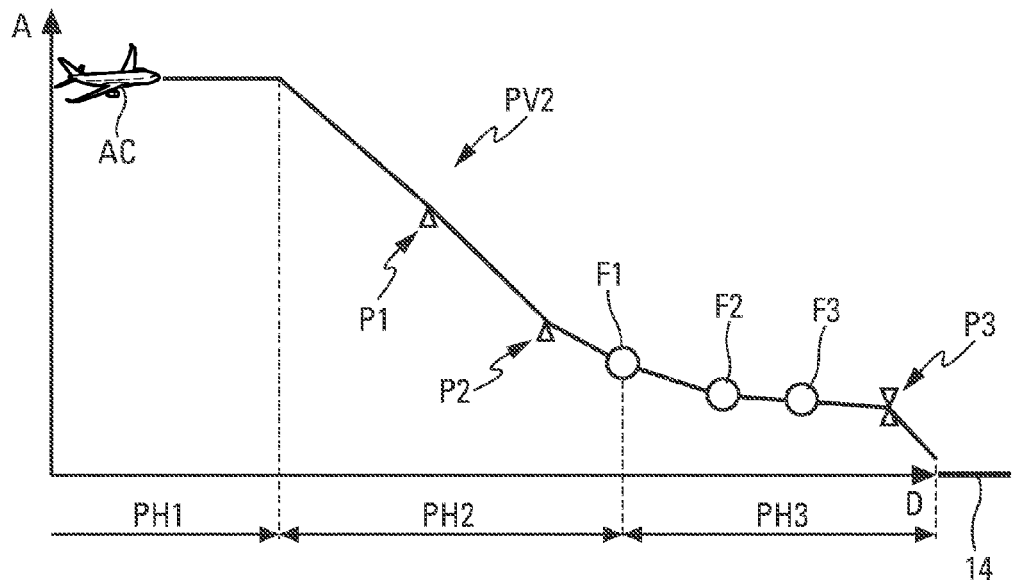
Figure 4:
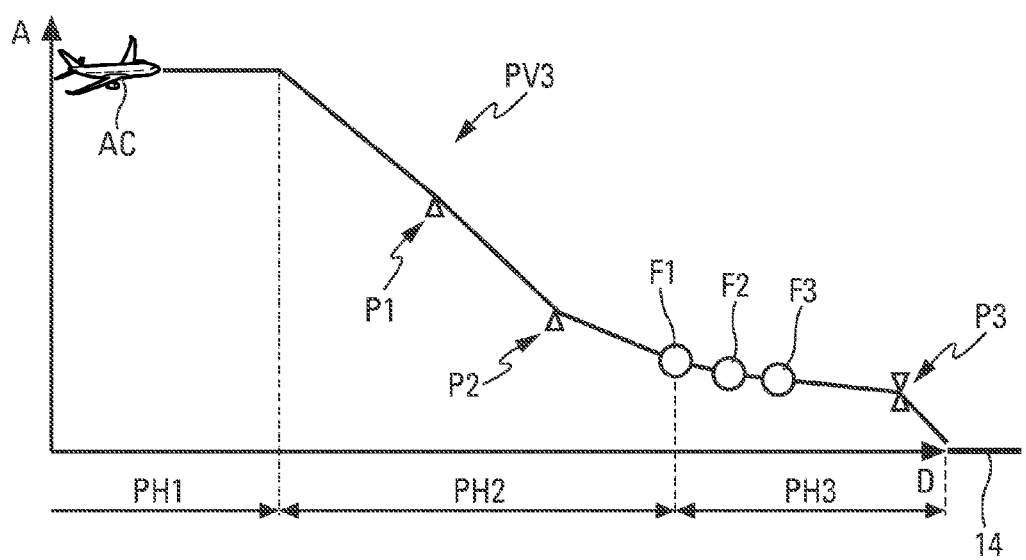

Moreover, a descent/approach altitude profile PV2 resulting from specific choices in adjustment (namely type of profile: geometric, deceleration at a gradient; approach configuration sequence: standard) of a second airline C2 is illustrated in FIG. 3. The vertical profile PV2 illustrated in FIG. 3 is calculated to meet the descent constraints by constructing a deterministic (geometric) profile which can thus be predicted by those on the ground, with an approach profile that allows for deceleration toward the approach speed at a gradient.

On the basis of this vertical profile PV2 (FIG. 3), adjusted for the airline C2, the crew may, during flight, request a readjustment of this vertical profile.

Thus, on the basis of the descent/approach profile proposed by the airline C2, bearing in mind the conditions of the day, which are considered to be favorable (light air traffic, very little weather disturbance), the crew can elect to fly at high speed for as long as possible and, therefore, to use a strategy of extension of the configurations "to the latest" along the approach phase. Thus, while at the same time as meeting the criteria of the airline C2, it has been possible for the resulting descent/approach profile PV3 (depicted in FIG. 4) to be customized to take the operational habits of the crew and the tactical situation of the arrival into consideration.

While at least one exemplary embodiment has been presented in the foregoing detailed description, it should be appreciated that a vast number of variations exist. It should also be appreciated the exemplary embodiment or embodiments are only examples, and are not intended to limit the scope, applicability, or configuration of the present disclosure in any way. Rather, the foregoing description will provide those skilled in the art with a convenient road map for implementing a an exemplary embodiment, it being understood that various changes may be made in the form, function, and arrangement of elements described in an exemplary embodiment without departing from the scope of the present disclosure as set forth in the appended claims and their legal equivalents.

What is claimed is:

1. A method of constructing, using a processor, a vertical profile for an aircraft descent and/or approach, the method comprising a first set of steps and a second set of steps, the first set of steps using values of a plurality of reference parameters, the first set of steps comprising:
   providing, for at least one of a plurality of strategic parameters, a value relating to a user strategy, said strategic parameters corresponding to at least some of said reference parameters, the values of a parameter corresponding to all the possible options offered for setting this parameter; and
   in automatically constructing said vertical profile using the value thus provided,
   the method additionally comprising a second set of steps carried out during a flight of the aircraft and comprising:
   a) presenting the crew of the aircraft with the values of a plurality of parameters referred to as tactical parameters, which have been used to calculate the vertical profile, the tactical parameters corresponding to at least some of said reference parameters;
   b) modifying at least one of said tactical-parameter values presented in step a); and
   c) automatically reconstructing the vertical profile using the value modified in step b); and further comprising an additional step, forming part of the second set of steps, situated between steps b) and c), and comprising verifying and validating each tactical parameter value modified in step b), and wherein only modified values that have been verified and validated are used in step c).

2. The method as claimed in claim 1,
   wherein the strategic parameters comprise at least one parameter relating to at least one of the following elements:

at least one type of vertical profile;
at least one final approach speed strategy;
at least one aircraft configuration sequence;
at least one deceleration assumption; and
at least one assumption regarding the use of the aircraft airbrakes.

3. The method as claimed in claim 1,
wherein said tactical parameters comprise at least one parameter relating to at least one of the following elements:
at least one type of vertical profile;
at least one final approach speed strategy;
at least one aircraft speed stabilization altitude;
at least one aircraft configuration sequence;
at least one deceleration assumption; and
at least one assumption regarding the use of the aircraft airbrakes.

4. A device for constructing, using a processor, a vertical profile for an aircraft descent and/or approach, said device comprising:
a construction unit configured to construct a vertical profile using values of a plurality of reference parameters;
a data capture unit configured to provide, for at least one of a plurality of parameters referred to as strategic parameters, a value relating to a user strategy, the strategic parameters corresponding to at least some of the reference parameters, the values of a parameter corresponding to all the possible options offered for setting this parameter, the construction unit being configured to automatically construct the vertical profile using the value thus provided;
a display unit configured to present the crew, during a flight of the aircraft, with the values of a plurality of parameters referred to as tactical parameters, which are used to calculate the vertical profile, the tactical parameters corresponding to at least some of the reference parameters;
an auxiliary data-capture unit configured to allow the crew to modify at least one of the tactical parameter values presented by the display unit;
verifying and validating each modified tactical parameter value to produce a set of verified values; and
an auxiliary construction unit configured to automatically reconstruct the vertical profile using the set of verified values.

5. The device of claim 4, wherein the strategic parameters comprise at least one parameter relating to at least one of the following elements:
at least one type of vertical profile;
at least one final approach speed strategy;
at least one aircraft configuration sequence;
at least one deceleration assumption; and
at least one assumption regarding the use of the aircraft airbrakes.

6. The device of claim 4, wherein the tactical parameters comprise at least one parameter relating to at least one of the following elements:
at least one type of vertical profile;
at least one final approach speed strategy;
at least one aircraft speed stabilization altitude;
at least one aircraft configuration sequence;
at least one deceleration assumption; and
at least one assumption regarding the use of the aircraft airbrakes.

* * * * *